United States Patent
Orts

[15] 3,655,154
[45] Apr. 11, 1972

[54] DEVICE FOR FIXING EQUIPMENT, SUCH AS ELECTRICAL APPARATUS, ON A SUPPORT

[72] Inventor: Joseph Orts, Stains, France

[73] Assignee: La Telemecanique Electrique, Nanterra, Hauts-de-Seine, France

[22] Filed: Mar. 3, 1970

[21] Appl. No.: 16,041

[30] Foreign Application Priority Data

Mar. 4, 1969 France..................................69/05928

[52] U.S. Cl..............................................................248/27
[51] Int. Cl. .........................................................G12b 9/08
[58] Field of Search......................248/27; 200/168 C, 168 D; 174/48, 49, 57

[56] References Cited

UNITED STATES PATENTS

| | | | |
|---|---|---|---|
| 2,916,673 | 12/1959 | Maslin et al.....................200/168 C X |
| 1,116,498 | 10/1914 | Schubert.................................248/27 |
| 3,146,010 | 8/1964 | Dellith................................248/27 X |

Primary Examiner—William H. Schultz
Attorney—Karl W. Flocks

[57] ABSTRACT

Improved device for fixing equipment, in particular electrical apparatus, on supports such as switchboards of the kind in which the apparatus comprises a threaded socket passing through an orifice formed in the switchboard and held by means of a knurled knob supported against the front face of said switchboard with no need to take into consideration the thickness of the switchboard because the screwing down of the knurled knob causes the rotation of the socket and the upward movement of a clamping ring against the internal face of the switchboard until the final fixing is obtained.

4 Claims, 4 Drawing Figures

DEVICE FOR FIXING EQUIPMENT, SUCH AS ELECTRICAL APPARATUS, ON A SUPPORT

The present invention relates to an improved device for fixing equipment, especially electrical apparatus, on supports such as switchboards.

It is known that electrical apparatus such as pushbuttons, switches, etc., generally comprises a threaded socket which is pushed through an orifice formed in the switchboard on which it is to be mounted, the socket being retained by means of a threaded button supported against the front face of the switchboard.

In order to take account of the various thicknesses of switchboard which can be employed, one or a number of packing washers are utilized in practice.

There is also known an improved washer with multiple thickness dimensions, in which several series of slots of the same width and the same depth are formed on its internal face, the height of the slots being, however, the same for slots of the same series but differing from one series to another.

There is furthermore provided on the device to be fixed a plurality of tenons adapted to be engaged in one of the series of slots, whereby the thickness dimension of the washer varies as a function of the series of slots selected for receiving the tenons.

The principal drawback of this system resides in that it is dependent on the thickness of the supporting plate, since this must previously be known in order to adopt the appropriate thickness dimension.

In addition, this system of slots of various heights can only be suitable for thicknesses of plates for which these slots are made. They are therefore very limited in number for a single type of washer, so that it is necessary to provide other washers for adapting to larger thicknesses of plates.

It should furthermore be observed that there is no continuity in the various intermediate dimensions of thickness, with the result that play may exist when the plate does not have the exact dimension desired, and there is then no means of taking up this play.

Finally, the system in question does not enable the outer part of the device to be given a perfectly uniform fixing thickness on the switchboard.

The device according to the present invention obviates the disadvantages of the systems at present known in that it offers, among others, the advantage that there is no need to take into consideration the thickness of the supporting plate and to make the necessary adaptation to this thickness, whatever it may be. In addition, due to the continuous adjustment with which it is provided, there cannot exist any case of intermediate thickness in which the fixing obtained can be subject to play.

In contradistinction to the previously known systems, the fixing device according to the invention furthermore takes into account the points detailed below:

The necessity, for reasons of appearance and uniformity, of having above the supporting plate a ring which is always of the same thickness for all the knobs or other operating accessories, so that these latter are mounted at the same level. This uniformity is all the more necessary since above these rings there are generally fitted protective fronts which also serve as a mask, on which is indicated the function of the knob or lever, these fronts being made by standard production.

The necessity of having a uniform depth of the lower part of the device, below the supporting plate, so that with the depth of the operating members placed below, the assembly can thus be previously calculated so as to be installed in a casing of corresponding depth.

The presence of a large number of knobs or levers on the supporting plate of a control switchboard having a relatively slightly raised surface, to such an extent that it is readily possible to mount the operating elements without the latter coming into contact. From this the necessity arises that the part placed under the plate must not rotate during the mounting, which could possibly cause a break in the adjacent connections.

The fact that, due to the existence of numerous different connections, it is frequently very difficult to fix the block from underneath, either because it cannot be held by hand or because there is no possibility of access for the use of a screwdriver. This results in the necessity of having a practical means to permit the fixing of a block of connections on a metal plate from the outer side of this latter.

The device according to the invention, which provides a solution for the above-mentioned problems in a simple and effective manner, is characterized by the fact that the base on which is mounted the element to be fixed on the switchboard is arranged in such manner as to ensure a double function of guiding in translation, preventing any rotation of a clamping ring, and of guiding in rotation while preventing any translation movement, of a threaded socket screwed into the said clamping ring, the said socket being fitted into a hole formed in the switchboard and being capable of being driven in rotation by a knob acting as a nut screwed on to the head of the threaded socket and abutting against the upper extremity of this latter, whereby the clamping ring rises and becomes blocked against the internal face of the switchboard.

According to a preferred form of construction, the device according to the invention comprises, in combination:

A hollow tubular base at the lower portion of which is provided a base plate intended for the fixing of an element, such as the connection block of an electrical apparatus, of which the central portion, preferably cylindrical, is provided on its outer wall with longitudinal anti-rotation guiding grooves, and the upper cylindrical portion of which has an external diameter less than that of the central portion and comprises an internal flange close to its upper extremity.

A clamping ring provided at its lower portion with tongues adapted to fit into and slide longitudinally in the grooves of the base, and having a threaded orifice having a diameter greater than that of the upper cylinder of the base portion.

A socket provided with an internal flange close to its upper extremity and with an external threaded portion capable of being screwed into the tapped orifice of the clamping ring, the base of the socket resting against the upper face of the central cylinder of the base portion while the upper cylinder of this latter serves as its longitudinal guide An element for locking the socket in translation, constituted by a ring coming into contact with the internal flange of the socket and provided with tongues which hook under the internal flange of the upper cylinder of the base portion, serving as a guide for the socket.

And a ring forming a nut, the tapped orifice of which screws on to the socket and which is provided with an internal flange coming into abutment against the upper edge of the socket, whereby when the socket is previously fitted into the hole of a switchboard on which the assembly is to be fixed, the screwing down of the ring forming a nut causes rotation of the socket and upward movement of the clamping ring against the internal face of the switchboard until the unit is definitely fixed.

The characteristic features, advantages and particularities of the present invention will be further brought out in the description which follows below with reference to the accompanying drawings, in which.

Figure 1:
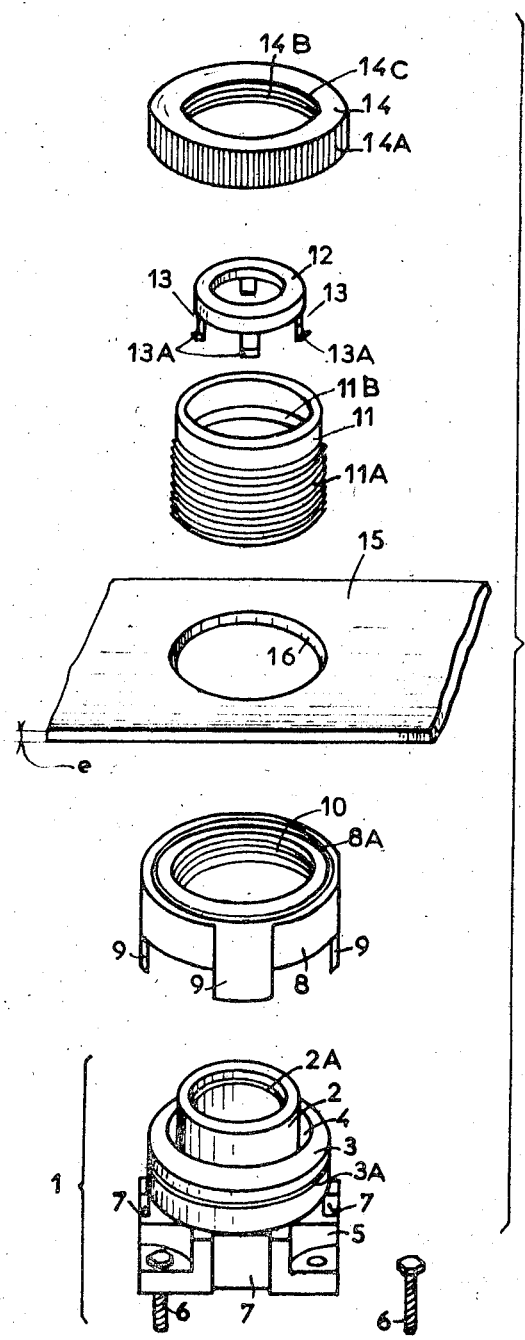
FIG. 1 is an exploded view in perspective showing the various constituent parts of a device for fixing a unit on a supporting plate, utilizing the system of the invention.

The fixing device according to the invention comprises essentially the various constituent parts shown by way of example in FIG. 1, it being understood that the forms of construction of each of these parts may be given many alternative constructions, provided that these latter permit the operation of the element considered to be ensured.

Having regard to the above observations, the device comprises, from the bottom towards the top of FIG. 1:

1. A base portion indicated by the general reference 1, consisting of two hollow coaxial cylinders forming guides, an upper cylinder 2 and a lower cylinder 3 of larger external diameter, the two cylinders being located in the extension of each other and having the same internal diameter. It should be noted, however, that the upper edge is provided with an internal lip $2_A$, the function of which will be described in detail later.

Between the two cylinders 2 and 3 is formed an annular groove 4, the function of which will also be described later.

According to an alternative form of construction, the upper surface of the cylinder 3 comes into contact with the wall of the cylinder 2.

At the lower portion of the cylinder 3 is provided a supporting base plate 5, on the lower face of which is fixed, for example by means of screws 6, any appropriate element such as a connection block of an electrical apparatus (not shown in the drawing).

In addition, the base plate 5 comprises an appropriate number, four in the example shown, of vertical guiding grooves 7, the precise purpose of which will be described in detail below.

Finally, a sealing ring $3_A$ is provided on the outer face of the cylinder 3.

2. A clamping ring 8 provided with four anti-rotation tongues 9 arranged to fit into and to slide with light friction in the grooves 7 of the base portion 1.

The ring 8 is provided with a tapped orifice 10, the function of which will be described below. The upper face of the ring 8 is provided with a sealing ring $8_A$.

3. A socket 11 provided with an external threaded portion $11_A$ arranged for screwing into the tapped hole 10 of the ring 8.

It should furthermore be noted that the internal and external diameters of the socket 11 are such that the latter can slide with light friction over the cylinder 2 forming a guide for the base portion 1 and comes to rest with its lower edge in the bottom of the annular groove 4 formed between the two cylinders 2 and 3 of the said base portion or, in the alternative form, on the upper face of the cylinder 3.

The socket 11 is finally provided close to its upper extremity with an annular internal shoulder $11_B$, the function of which will be described later.

4. A device for blocking translation movement of the socket 11, constituted by a ring 12 which becomes supported by its outer face against the interior of the socket 11, and by its lower face on the annular shoulder $11_B$ of the socket.

The blocking ring is further provided with a certain number (four, for exaMple) of vertical legs 13, each comprising a small hook $13_A$ turned towards the exterior.

It should be noted that these legs 13 are arranged in such manner that their hooks $13_A$ pass freely inside the shoulder $11_B$ of the socket 11, but on the other hand, the hooks can become engaged under the internal lip $2_A$ of the cylinder 2 of the base portion 1, as will be seen in detail later.

5. A ring 14 which is knurled externally at $14_A$ is provided with an internal thread $14_B$ arranged to be screwed on the threaded portion $11_A$ of the socket 11 and comprises at its upper extremity a flange $14_C$ adapted to come into abutment against the upper edge of the socket 11 when the ring 14 is screwed on to this socket.

6. Although it does not form an integral part of the device proper, the plate 15 on which the assembly is to be fixed must be pierced with a hole 16 having a diameter slightly larger than that of the threaded portion $11_A$ of the socket.

It is interesting to note that the thickness $e$ of the said plate can vary in large proportions without any necessity of modifying in any way whatever the fixing device according to the invention.

There will now be described in detail with reference to FIGS. 1, 2 and 3 the method which must be followed in order to assemble together the various constituent parts of the device on the one hand and to fix the assembly on a plate on the other hand, it being understood that in order to simplify the description, no particular application of the invention will be given, this aspect being dealt with later with reference to FIG. 4.

In a first stage, the ring 8 is fitted on the cylinder 3 in such manner that the anti-rotation tongues 9 slide fully into the grooves 7 of the cylinder 3 of the portion 1.

After this, the socket 11 is screwed into the threaded orifice 10 of the ring 8 until the lower edge of the socket 11 comes to bear against the bottom of the groove 4.

The ring 12 is fitted on the head of the socket 11 and this ring is forced inward until the hooks $13_A$ of the legs 13 become engaged under the edge of the shoulder $2_A$ of the cylinder 2. It should be noted that from this moment, the socket 11 can still rotate on the guiding cylinder 2 but can no longer leave the circular groove 4.

It only remains to screw the knurled ring 14 on the threaded portion $11_A$ of the socket 11 until the flange $14_C$ comes into contact with the upper edge of the socket 11.

Figure 2:
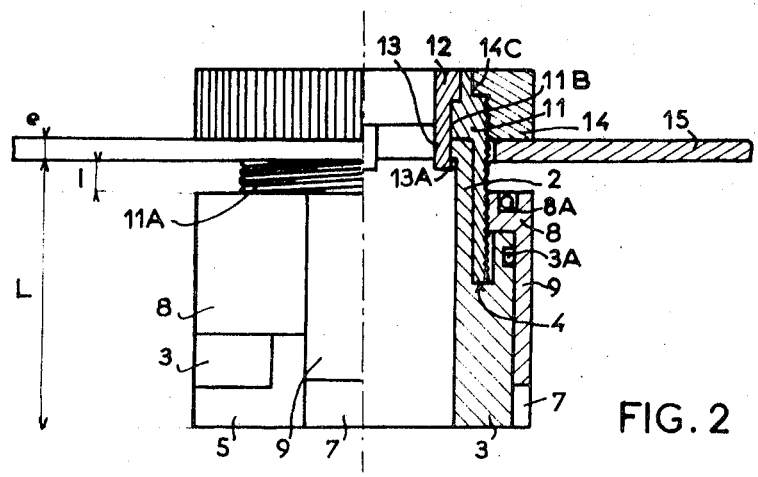
FIGS. 2 and 3 show in half-elevation, half-section and on a larger scale the device of FIG. 1, the constituent parts of which are in this case assembled together, the said device being shown respectively at the beginning and at the end of the clamping phase proper of the unit on the supporting plate.

At this moment, the socket 11 is passed through the orifice 16 in the plate 15, the assembly then being in the position shown in FIG. 2, that is to say, the base portion 1 is held but not fixed against the plate 15, it being noted that the fixing lugs of the base plate 5 are at that moment located at a distance L from the lower face of the plate 15, which has a thickness $e$.

It can immediately be seen that if the knurled ring 14 is continued to be rotated in the direction of tightening, this will have the effect of causing the socket 11 to turn in the same direction around the cylindrical guide 2 due to the fact that the flange $14_C$ of the ring 14 is in abutment against the socket and that in consequence the two parts in question are then locked together.

In addition, as the socket 11 rests against the bottom of the groove 4 on the one hand, the ring 8 not being able to rotate because its anti-rotation tongues 9 are lodged in the grooves 7 of the cylinder 3 on the other hand, and since the socket 11 can rotate on the guide cylinder 2 but cannot pass out of the groove 4, it can finally be seen that the ring 8 is compelled to rise laterally along the threaded portion $11_A$ of the socket 11 as and when the assembly 14–11 is rotated.

When the clamping ring 8 comes into contact with the lower face of the plate 15, the unit is definitely fixed against the said plate. The position obtained is then that shown in FIG. 3.

Figure 3:
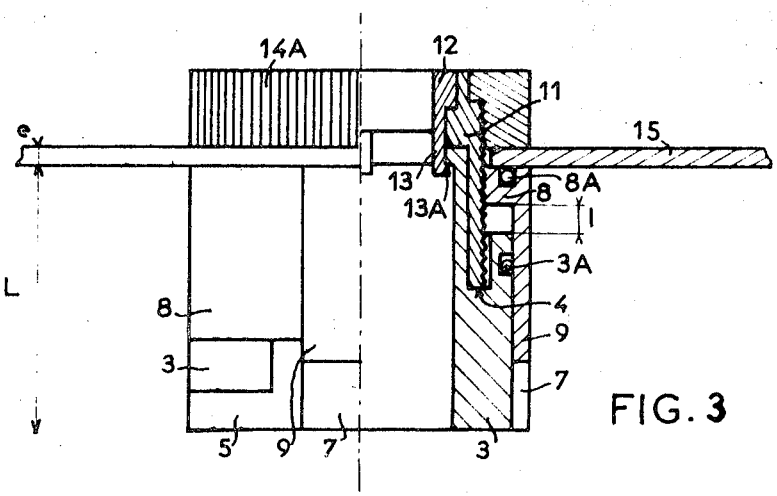

It is important to note that the distance L of FIG. 3 separating the plate from the lower face of the base plate 5 has remained identical with that which existed at the start in FIG. 2. The distance $l$ existing between the upper face of the ring 8 and the lower face of the plate 15 in the initial position of FIG. 2 is replaced by the same distance $l$ in the final locked position of FIG. 3, which separates the lower face of the ring 8 from the upper face of the cylinder 3.

This arrangement has the further advantage that it is not necessary to take the thickness $e$ of the plate 15 into consideration provided, obviously, that this is not greater than the length of the socket 11 comprised, in the initial position of FIG. 2, between the opposite faces of the knurled ring 14 and the clamping ring 8.

Figure 4:
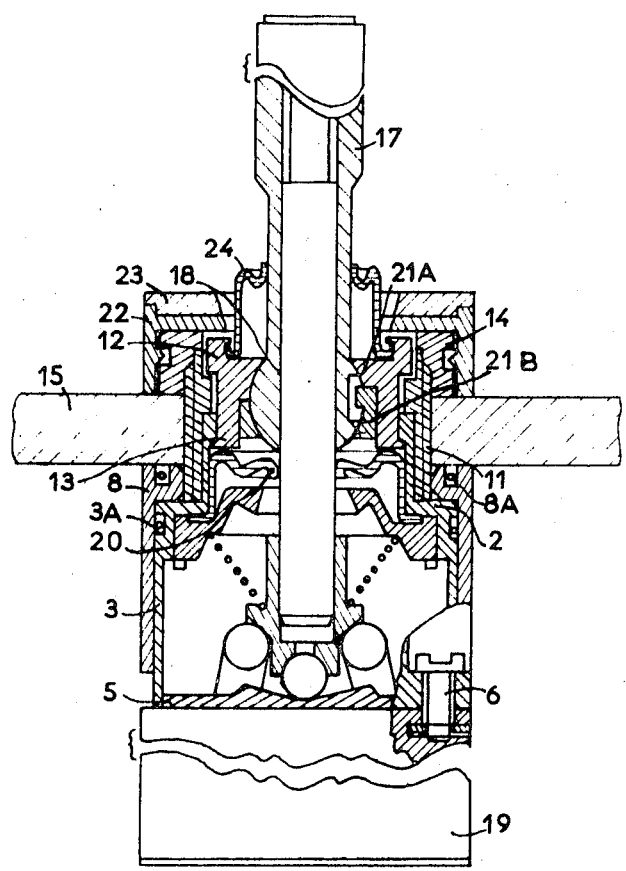
FIG. 4 is a view in cross section elevation of the application of the invention to the fixing of an operating lever, movable in all directions, to a connection block.

There has been shown in FIG. 4 the application of the device according to the invention to the fixing of an operating lever 17 movable in all directions with respect to a ball and socket joint 18 on the plate 15 of a switchboard, this lever being intended to operate, in a manner known per se, a connection block 19 fixed by screws such as 6 to the base plate 5 of the base portion. A sealing diaphragm 20 isolates the inside of the switchboard on which the lever is fixed.

In order to avoid unnecessary complication of the description, each of the constituent parts of the fixing device proper will not again be described if these are similar to those of the preceding FIGS. 1 to 3 and have the same functions. Only the shapes of these parts are slightly different in order to adapt them to the particular application which is made of the device according to the invention.

Thus in particular, the lower cylinder 3 of the base portion has a larger internal diameter than that of FIGS. 2 and 3 in order to permit the pivotal movement of the lever 17 about the swivel joint 18 in all directions.

Furthermore, according to a form of embodiment which is of simpler construction, the threaded socket 11 comes directly to rest on the upper face of the cylinder 3. In other words, the outer face of the groove 4 is eliminated and replaced by the threaded internal wall of the ring 8.

The element 12 for blocking the lateral movement of the threaded socket 11 is arranged so as to constitute the upper portion $21_A$ of the circular socket intended to receive the ball 18 of the lever 17, while the lower portion $21_B$ of the said spherical socket is formed in the central portion of the head of the cylinder 2 serving as a guide for the threaded socket 11.

When once the lever has been fixed in position on the plate 15 of the switchboard which is gripped between the knurled ring 14 and the clamping ring 8 following the method which was previously described with reference to FIGS. 1 to 3, the said knurled ring 14 is covered by a front carrying on its upper face a table 23 on which are inscribed the desired indications permitting the user to know the orders which he will give or the results obtained by pushing the lever 17 in one direction or the other.

Finally, a sealing diaphragm 24 isolates the ball joint 18 from the impurities which the surrounding atmosphere outside the switchboard 15 is liable to contain.

It is clearly evident from the foregoing description that the fixing device in accordance with the invention may have a large number of applications, especially in the field of fixing electrical apparatus on switchboards.

I claim:
1. A device for mounting an apparatus to be fixed in an aperture of a panel, the device including in combination:
   a. a hollow base at the lower portion of which is provided a base plate for fixing the apparatus, said base presenting towards the panel a hollow cylinder, said cylinder junction with the base an abutting surface being perpendicular to the axis of the cylinder, said base provided externally with at least one longitudinal groove parallel to the axis,
   b. an annular socket adapted to fit rotatively on the outward surface of said cylinder and to abut by its extremity on said abutting surface between the cylinder and the base, said socket being threaded externally and provided with a ring member to be screwed on the thread of the socket and to be blocked to the top thereof, said socket being removably attached on its top to an internal lip of the cylinder of said base by a snapping member,
   c. and a clamping ring acting as a nut, which has a surface adapted to meet inwardly the rear face of the panel, said clamping ring being screwed on said threaded part of the socket, said clamping ring presenting opposite the panel, at least a lug adapted to slide in the groove of said base; whereby, after assembling the parts of the device, through the aperture of the panel, by turning the ring member which is blocked on the annular socket, the clamping ring will move longitudinally and clamp the edge of the panel against the ring member oppositely positioned, without which the base could rotate.

2. A device according to claim 1, in which the base is provided with a cylindrical part which overlaps the said cylinder of the base, the overlapping part forming an annular groove to receive the lower portion of said socket, and the bottom of the groove constituting the said abutting surface for the extremity of said socket, said overlapping part having a cylindrical periphery with a groove for a sealing joint, whereby the clamping ring has an internal chamber to slide on said sealing joint.

3. A device according to claim 1, in which said snapping member is a ring, said ring having a plurality of vertical legs, each leg comprising a small hook turned towards the exterior.

4. A device according to claim 1 in which the top of said socket presents two shoulders in order that said snapping member and said ring member may be flush with said top.

* * * * *